United States Patent [19]

Hargreaves et al.

[11] 4,136,142

[45] Jan. 23, 1979

[54] PROCESS FOR EXTRUDING STABILIZED EXPANDED POLYSTYRENE COMPOSITION

[75] Inventors: Brian Hargreaves; Michael H. Richmond, both of Sarnia, Canada

[73] Assignee: Polysar Limited, Sarnia, Canada

[21] Appl. No.: 780,500

[22] Filed: Mar. 23, 1977

[51] Int. Cl.$^2$ .............................................. B29D 27/00
[52] U.S. Cl. .............................. 264/53; 260/33.6 PQ; 260/45.7 PH; 260/45.95 R; 264/37; 264/211; 264/DIG. 69; 521/88; 521/146
[58] Field of Search ................ 260/45.95 B, 33.6 PQ, 260/45.7 PH, 2.5 B; 264/53, 211, 37, DIG. 69

[56] References Cited

U.S. PATENT DOCUMENTS

| | | | |
|---|---|---|---|
| 3,151,192 | 9/1964 | Jacobs et al. | 264/53 |
| 3,160,688 | 12/1964 | Aykanian et al. | 264/53 |
| 3,239,484 | 3/1966 | Stark | 260/33.6 PQ X |
| 3,287,477 | 11/1966 | Vesilind | 264/53 |
| 3,294,736 | 12/1966 | Jacob | 260/45.95 B |
| 3,344,215 | 9/1967 | De Witz et al. | 264/53 |
| 3,509,091 | 4/1970 | Cleveland et al. | 260/45.7 PH X |
| 3,530,091 | 9/1970 | Kitaoka et al. | 260/45.95 B X |
| 3,637,587 | 1/1972 | Cyba | 260/45.95 B X |
| 3,856,728 | 12/1974 | Abramoff | 260/45.95 B X |
| 3,856,747 | 12/1974 | Dibiasi | 260/45.95 B X |

OTHER PUBLICATIONS

Collins, F. H. "Controlled Density Polystyrene Foam Extrusion" in *SPE Journal*, Jul. 1960, pp. 705–709.

*Primary Examiner*—Philip Anderson
*Attorney, Agent, or Firm*—Stevens, Davis, Miller & Mosher

[57] ABSTRACT

Crystal polystyrene is satisfactorily protected against oxidative degradation in foam extrusion processes and thermoforming of articles from the expanded product so formed, by incorporation therein of a combined stabilizer system, comprising from about 0.01 to about 0.5 parts by weight of a hindered phenol compound such as 1,1,3-tris(2-methyl-4-hydroxy-5-tert.butyl phenyl) butane, and from about 0.02 to about 1.0 parts by weight of a tris (substituted phenyl) phosphite such as tris (mixed mono- and dinonylphenyl phosphite), based upon 100 parts by weight of polystyrene. Such stabilized foamed crystal polystyrene may be used for the production of formed articles.

3 Claims, No Drawings

PROCESS FOR EXTRUDING STABILIZED EXPANDED POLYSTYRENE COMPOSITION

FIELD OF THE INVENTION

This invention relates to the extrusion of foamed polystyrene compositions, and more particularly to the extrusion of foamed stabilized crystal polystyrene compositions having improved resistance to oxidative degradation.

BACKGROUND OF THE PRESENT INVENTION

Crystal polystrene is a term which is applied to homopolymeric polystyrene containing no reinforcing polymeric material such as rubber. Crystal polystyrene is normally a clear, colorless, transparent resin, used for making injection molded articles and films. Another large application is in the manufacture of expanded thermoplastic polystyrene foams, in which the crystal polystyrene is mixed with a blowing agent, e.g. pentane or fluorocarbon compounds, under conditions causing vaporization of the blowing agent while mixed in the molten polystyrene.

The resistance of crystal polystyrene to oxidative degradation has generally been regarded as adequate in itself, so that stabilizer systems for it have not received extensive investigation. The art is replete with descriptions of stabilizers for impact polystyrenes. The problem of oxidative degradation is much more prevalent with impact polystyrene, however, because of the presence therein of the reinforcing rubber which contains carbon-carbon unsaturation. However, the stabilization of crystal polystyrene, which contains no unsaturated rubber, is not normally a problem.

There is, however, at least one specific area where oxidative degradation of polystyrene is a signficant problem. This is in relation to the production of thermoformed articles from extruded foam polystyrene sheet. During such a process, it has been found that oxidative degradation of polystyrene is likely to occur to an extent having an adverse effect on the physical properties of the thermoformed articles.

BRIEF DESCRIPTION OF THE PRIOR ART

Much previous work has been done and reported in the literature on antioxidant, stabilizer systems for use with polymers where oxidative degradation is a serious problem in limiting the service life of articles made from the polymers. Thus, synthetic and natural rubbers, polypropylene, impact polystyrenes and the like are commonly mixed with small amounts of antioxidant compounds. A wide variety of different types of antioxidants, for example sulfides, thioethers, organic phosphates and phosphites, hindered phenols and phenolic esters, amine compounds, etc. have been proposed for this purpose. Substantial numbers of specific compounds within each group are known to be effective, with particular polymers. The various mechanisms by which antioxidants serve to protect polymers against oxidative degradation are incompletely understood. To find a particular antioxidant which is effective in protecting a particular polymer against degradation under a certain set of conditions to which it may be subjected in processing or use, and which will not adversely affect other characteristics of the polymer or articles made therefrom, is a difficult problem.

SUMMARY OF THE INVENTION

It is an object of the present invention to provide novel, method of extruding foamed stabilized crystal polystyrene.

It is a further object of the invention to provide a process for preparing expanded polystyrene articles in an economic manner, the expanded polystyrene having enhanced protection against oxidative degradation.

According to the present invention, in one aspect there is provided a stabilized crystal polystyrene composition comprising 100 parts by weight of crystal polystyrene, from about 0.01 to about 0.5 parts by weight of a hindered phenol of general formula

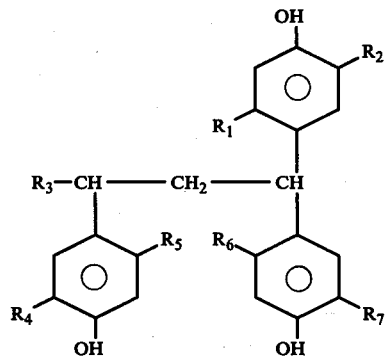

where $R_1$, $R_3$, $R_5$ and $R_6$ are independently selected from the group consisting of hydrogen and alkyl radicals having 1–6 carbon atoms, and $R_2$, $R_4$, and $R_7$ are independently selected from the group consisting of secondary and tertiary alkyl radicals having from 3–6 carbon atoms;

and from about 0.02 to about 1.0 parts by weight of a tris(substituted phenyl) phosphite.

According to a second aspect of the present invention, there is provided a process of preparing expanded foam polystyrene, which comprises:

preparing a foam extruder feed material comprising from about 20 to about 50 parts by weight of solid pellets of previously expanded recycle foam polystyrene, said recycle polystyrene having been reduced from expanded form by compaction and extrusion at temperatures in the 400°–550° F. range and by repelletization, and from about 80 to about 50 parts by weight of pellets of virgin polystyrene and from about 0.01 to about 0.5 parts by weight of a hindered phenol of general formula

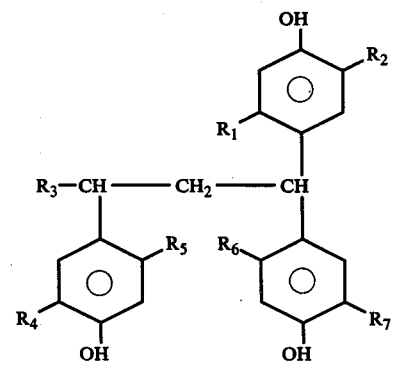

where $R_1$, $R_3$, $R_5$ and $R_6$ are independently selected from the group consisting of hydrogen and alkyl radicals having 1–6 carbon atoms, and $R_2$, $R_4$ and $R_7$ are independently selected from the group consisting of secondary and tertiary alkyl radicals having from 3–6 carbon atoms, and from about 0.02 to about 1.0 parts by weight of tris (substituted phenyl) phosphite;

feeding said material to a first stage being an extruder operating at temperatures of from 400°–550° F. so as to melt and homogeneously mix the feed material;

adding blowing agent to said molten material in the first stage, and dispersing the blowing agent within the molten material therein;

feeding the material to a second stage being a section of said extruder or a second extruder operating at lower temperatures so as to cool the feed material to temperatures of from about 230°–315° F.;

and extruding the material from said second stage through a die, at a temperature from about 230°–315° F. and foaming the extrudate.

As further described below, the above stabilized crystal polystyrene composition can be processed by extrusion to produce expanded polystyrene sheets, and articles may be thermoformed from the expanded sheet, without the polymers undergoing oxidative degradation to an extent which adversely affects the physical properties of the polymer to any significant extent. Moreover, it has been found that this stabilized polystyrene, after the extrusion and thermoforming process, can be re-extruded and repelletized for recycle purposes through the extrusion process, without undergoing serious oxidative degradation, despite the elevated temperatures and shearing in the presence of oxygen which it must undergo preparatory to recycling.

DESCRIPTION OF THE PREFERRED EMBODIMENTS

The specific preferred antioxidant combination for use in the present invention is 1,1,3-tris (2-methyl-4-hydroxy-5-tert. butylphenyl) butane, having the formula

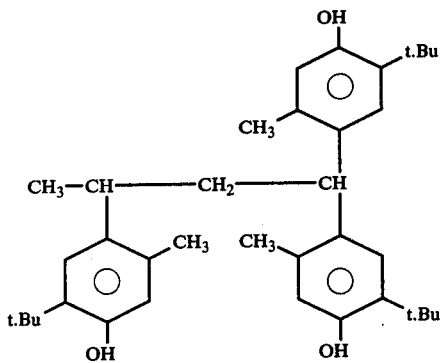

along with tris(mixed mono- and di-nonylphenyl)-phosphite of general formula

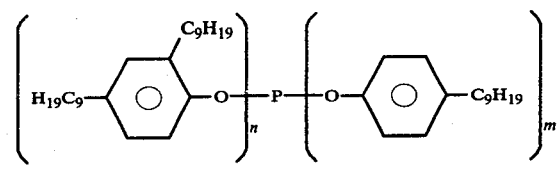

where n and m are 1 or 2, and n + m = 3. The 1,1,3-tris (2-methyl-4-hydroxy-5-tert.butylphenyl) butane can be prepared by condensing three moles of 3-methyl-6-tertiary-butylphenol with crotonaldehyde.

The compositions of the present invention are, as noted, particularly useful for making thermoformed, foamed polystyrene articles. In extrusion and thermoforming processes, crystal polystyrene in pellet form, in admixture with a wetting agent and a nucleating agent, is melted by heating to a relatively high temperature, e.g. 400°–550° F., in an extruder. A blowing agent, a low molecular weight material such as pentane or a fluorocarbon, is pumped into the extruder and thoroughly mixed with the molten polystyrene. Then the molten polystyrene, with the blowing agent mixed in homogeneously, moves into a cooler second stage which is a section of said extruder or a second extruder, where its temperature is reduced to the 230°–315° F. range. At this temperature, it is extruded through a die, normally an annular die. Immediately after exit through the die, the blowing agent volatilizes within the resin to cause expansion of the resin to form foam. Careful control of temperature and other extrusion conditions are necessary to ensure the production of good quality expanded foam products. Then the extruded, expanded material is slit into sheets, aged for a period of time, and then articles are made from the expanded sheets by hot pressing.

In the process, the crystal polystyrene is subjected to high shearing forces and mixing in an extruder at high temperatures in the 400°–550° F. range, and for a fairly extended period of time. Thorough, homogeneous mixing of the molten polystyrene with other additives such as nucleating agent and blowing agent is necessary. It is however also necessary to extrude the polystyrene at much lower temperatures, i.e. in the 230°–315° F. range, which are only slightly above the glass transition temperature of the resin, in order to obtain good quality expanded resin, with the required degree of orientation in two directions to provide good physical properties.

Because of this need for cooling the resin prior to extrusion and expansion, in a second stage, the residence time of the resin in the first stage, higher temperature part of an extruder has to be substantial. The operation of the extruder is such that air (i.e. oxygen) is not excluded, so that the oxidative degradation of the resin is likely.

There is however, a further and perhaps more serious problem of oxidation degradation of polystyrene during such processes, and this relates to the use of recycle material. After articles are thermoformed from the expanded sheets, economic considerations dictate that the remaining scap material be recycled through the process. For this purpose, the scrap foam material is fed to a recycle extruder, where it is processed at temperatures in the 400°–550° F. range for a substantial period of time, to reduce it to non-foam form. On exit from the recycle extruder, the material is chopped into pellets, which can then be mixed with fresh crystal polystyrene pellets to re-enter the process. Since the recycle material is subjected to shearing at high temperatures for substantial periods of time, and since the recycle extruder is operated such as not to exclude oxygen from the atmosphere or to eliminate any oxygen entrapped in the material to be recycled, oxidative degradation of the recycle material is likely, and to a greater extent than in the case of the process for the manufacture of the original formed sheet.

The feed to the first stage in a typical commercial process will comprise from about 20 to about 50 percent of recycle material, and from about 50 to about 80 percent of virgin crystal polystyrene. As a consequence, any reduction in average molecular weight of the recycle material will have a significant effect on the average molecular weight of the material being extruded in expanded form from the second stage extruder.

It has been found that the best quality polystyrene sheets for making thermoformed articles by the process described should have a melt viscosity which corresponds to a weight average molecular weight of the polymer of not less than about 280,000, along with relatively narrow molecular weight distribution. Unless the antioxidant system according to the present invention is used, one must start with crystal polystyrene of weight average molecular weight at least 330,000 to allow for the oxidative degradation occurring in the foam extrusion process and occurring in the recycling process. This presents economic problems, since crystal polystyrenes of molecular weight 330,000 and higher, known commercially as ultrahigh molecular weight polystyrenes, are more expensive to produce than polystyrenes of lower molecular weights. In addition, the molecular weight of the polystyrene extrudate should not be too high, e.g. above about 350,000, otherwise a readily extrudable and handleable material is not obtained. Ultrahigh molecular weight polystyrenes generally have to be produced by relatively expensive suspension polymerization processes. Lower molecular weight crystal polystyrenes may be produced by continuous bulk polymerization processes, and are of lower cost to produce.

The present invention thus provides a means for utilizing lower cost, readily available, bulk polymerized crystal polystyrene in the manufacture of expanded polystyrene sheets and thermoformed goods, of high quality. The present invention also permits the use of suitable suspension polymerized polystyrene of the lower molecular weight range. This is of significant commercial importance. The particular antioxidant system described herein is capable of protecting the polystyrene against oxidative degradation in the above process, sufficiently to allow use of bulk polymerized crystal polystyrenes of weight average molecular weight of not higher than about 315,000 for example. The polystyrene is sufficiently protected, even during recycle processing and with use of up to 50% recycle material in the first stage to yield high quality expanded product. The combined antioxidant system according to the invention appears to be specific in its ability to afford this necessary protection. Other antioxidants are not sufficiently effective. Even the individual antioxidants of the combination are not sufficiently effective alone.

Not only is the preferred antioxidant system according to the invention effective in protecting against oxidative degradation, but also it achieves this without causing an unacceptable discoloration of the polystyrene. In addition, the system is believed to be acceptable for use in compositions to be used in contact with edible products, a field in which foam polystyrene thermoformed materials find large application.

The point of addition of the antioxidants to crystal polystyrene is not critical, provided that it precedes the high temperature working of the polystyrene in the extruder. They can be added to the polystyrene after its production by polymerization, or immediately before its extrusion, e.g. after the feed hopper communicating with the extruder.

The foam polystyrene of this process, and as used for thermoforming of articles, will generally have a foam density of about 2 to about 12 lbs./cubic ft.

The wetting agents and nucleating agents referred to above which are mixed with the polystyrene prior to extrusion serve to enhance the extrusion process. They are well known in the art, and do not require detailed description herein. Typical wetting agents are mineral oils added in the amount of approximately 0.2% by weight, based upon the weight of polystyrene pellets. A typical nucleating agent is a stoichiometric mixture of citric acid and sodium bicarbonate, in an amount of about 0.2–0.5% by weight based upon the weight of polystyrene pellets. Similarly, the other elements of the process do not differ significantly from practices normally followed in foam extrusion processes. It will be understood that polystyrene molecular weights reported herein are weight average molecular weights determined by gel permeation chromatography using well known procedures, and the intrinsic viscosity is calculated from the GPC data.

The invention is further described with reference to specific examples.

EXAMPLE 1

(Control)

Samples of foam extruded polystyrenes were prepared using a commercial scale foam extrusion facility, and the molecular weight of the resulting foam was determined and compared with that of the initial, virgin polystyrene and of the mixture of virgin polystyrene and recycled pelletized material fed to the extruder.

The apparatus used in the process of the example was substantially as previously described. It comprised a main extruder having a first mixing and melting stage heated to approximately 460° F., and a second stage fed from the first stage which cools the melt to approximately 260° F. Foaming agent (a pentane) was fed to the molten material under pressure in the first hot stage of the extruder. The material was extruded from the second stage through an annular die, and formed expanded product as it was extruded. The extruded material was slit into sheet form, aged, and articles were thermoformed from the sheets. Scraps of foamed material left after the thermoforming operation were fed into a recycle extruder, in which they were heated to about 470° F. for a substantial period of time, extruded, cooled and chopped into pellets.

The feed to the main extruder consisted essentially of a mixture of 55 parts by weight of a commercially available virgin crystal polystyrene produced by suspension polymerization, and 45 parts by weight of recycled polystyrene originally from the same virgin crystal polystyrene, along with very small quantities of mineral oil wetting agent and sodium bicarbonate/citric acid nucleating agent. No antioxidants were added. The foamed material so formed was tested for molecular weight distribution by gel permeation chromatography, the GPC results being used to calculate the data provided in Table 1. The molecular weight $M_w$ of the recycled polystyrene ranged from 251,000 to 266,00.

TABLE 1

| Sample | $M_w$ | Intrinsic Viscosity | % polymer having $M_w$ below 100,000 | % polymer having $M_w$ above 600,000 |
|---|---|---|---|---|
| Virgin crystal polystyrene | 343,800 | 0.83 | 17.51 | 16.55 |
| Extruder feed, 55% virgin crystal polystyrene, 45% recycle | 326,300 | 0.80 | 18.75 | 14.45 |
| Foamed extrudate | 301,400 | 0.76 | 20.0 | 13.38 |

The above results indicate that significant degradation of the polystyrene occurs in the process and that in order to maintain the molecular weight of the foamed extrudate above about 280,000, to maintain a relatively narrow molecular weight distribution and to achieve the required properties in the articles thermoformed therefrom, it is necessary to sue an ultra-high molecular weight polystyrene, i.e. a molecular weight above about 330,000, or find some means of protecting the polystyrene from degradation in the process.

EXAMPLE 2

Laboratory experiments were conducted on crystal polystyrene samples, to evaluate the protection against oxidative degradation afforded them by antioxidant compounds according to the present invention.

The laboratory apparatus was a Brabender Plasticorder (trade mark) torque rheometer to work the polymer under shear at elevated temperatures and hence subject it to conditions likely to cause oxidative degradation, in simulation of the previously described oxidative degradation. As is well known, this apparatus is a temperature controlled mixer having rotors therein, and permitting torque developed by the rotor shaft at a given speed of rotation to be measured. In this example, tests were conducted at jacket temperatures of 445°–470° F. and at a rotor speed of 100 rpm for a period of ten minutes.

Three different commercially available polystyrene samples were used in the experiment, samples A and C being bulk polymerized and sample B being a suspension polymerized sample. Their characteristics ere as follows:

A — a Monsanto crystal polystyrene for which a molecular weight ($M_w$) was determined to be 314,700 and the molecular weight distribution ($M_w/M_n$) was found to be 2-12;

B — an ultra high molecular weight U.S. Steel crystal polystyrene for which a molecular weight ($M_w$) was determined to be 360,400 and the molecular weight distribution ($M_w/M_n$) was found to be 2.78;

C — an Eastern Stirling crystal polystyrene for which a molecular weight ($M_w$) was determined to be 302,500 and the molecular weight distribution ($M_w/M_n$) was found to be 2.70.

The relevant properties of these various commercial samples, prior to treatment in the Brabender as above described, are given in the following table. To a sample of each of these crystal polystyrenes under tests, there was added 0.1 part by weight of 1,1,3-tris (2-methyl-4-hydroxy-5-tert.butyl phenyl) butane and 0.3 parts by weight of tris (mixed mono- and dinonylphenyl) phosphite, per 100 parts by weight of polystyrene, and the resultant composition heated and sheared in the torque rheometer as above described. A similar sample of each polystyrene containing no antioxidant was similarly treated. Measurements of molecular weight and moleclar weight distribution were made and the intrinsic viscosity was calculated therefrom. A measurement of torque on the rheometer after ten minutes processing was also made. The results are given in Table II.

TABLE II

| Experiment No. | Sample | Antioxidant present | $M_w$ | Intrinsic Viscosity | % $M_w$ less than $10^5$ | % $M_w$ greater than $6 \times 10^5$ | Torque 10 min (meter. grams) |
|---|---|---|---|---|---|---|---|
| 1 | A, before Brabender processing | No | 314,700 | 0.80 | 14.56 | 12.30 | — |
| 2 | A, after Brabender processing | No | 143,500 | 0.45 | 43.85 | 0.80 | 440 |
| 2 | A, after Brabender processing | Yes | 284,300 | 0.74 | 17.85 | 9.50 | 640 |
| 4 | A, after Brabender processing | Yes* | — | — | — | — | 630 |
| 5 | B, before Brabender processing | No | 360,400 | 0.85 | 20.0 | 18.3 | — |
| 6 | B, after Brabender processing | No | 125,100 | 0.40 | 54.2 | 0.75 | 410 |
| 7 | B, after Brabender processing | Yes | 292,700 | 0.74 | 21.6 | 12.15 | 640 |
| 8 | C, before Brabender processing | No | 302,500 | 0.76 | 22.7 | 13.4 | — |
| 9 | C, after Brabender processing | No | 195,100 | 0.56 | 33.8 | 3.9 | 360 |
| 10 | C, after Brabender processing | Yes | 288,100 | 0.74 | 21.7 | 11.5 | 555 |

*This sample contained 0.05 parts 1,1,3-tris(2-methyl-4-hydroxy-5-tert.butylphenyl) butane and 0.15 parts tris (mixed mono-and dinonylphenyl) phosphite.

These results indicate the efficacy of the protected, stabilized composition according to the present invention. It is noted that all the stabilized compositions, after Brabender processing, show a similar high value for the torque. Even the ultra high molecular weight polystyrene B is stabilized by the presence of the antioxidants.

EXAMPLE 3

Experiments were conducted using the Brabender Plasticorder torque rheometer, as described in example 2, to evaluate the protection afforded crystal polystyrene against oxidative degradation by other types of stabilizer compositions. The various stabilizer compounds used were as follows:

M — 2,6-ditertiary-butyl-p-cresol;
N — a tri-phosphite, namely tris(mixed mono- and dinonylphynyl) phosphite;
O — a tris-(hindered phenol) namely, 1,1,3-tris (2-methyl-4-hydroxy-5-tert.-butyl phenyl) butane;
P — a di-hindered phenol, namely 4,4'-methylene-bis (2,6-di-tert.butyl phenol);
Q — a mixed hindered phenol, namely, butylated styrenated cresol;
R — an ester-hindered phenol, namely octadecyl-3-(3'-5'-ditert. butyl-4'-hydroxy phenyl) propionate.

As in example 2, the Brabender was operated at a jacket temperature of 440°-460° F. and a rotor speed of 100 rpm, for a total processing time of ten minutes, and the results are shown in Table III.

TABLE III

| Polystyrene | Antioxidant | Torque, meter. grams After 5 mins | Torque, meter. grams After 10 mins | Jacket temp °F |
|---|---|---|---|---|
| A, 100 parts by wt. | — | 680 | 440 | 457 |
| A, 100 parts by wt. | M, 0.15 parts by wt. | 740 | 610 | 457 |
| A, 100 parts by wt. | N, 0.30 parts by wt. | 560 | 510 | 457 |
| A, 100 parts by wt. | O, 0.10 parts by wt. | 730 | 580 | 457 |
| A, 100 parts by wt. | P, 0.15 parts by wt. | 870 | 700 | 457 |
| A, 100 parts by wt. | Q, 0.15 parts by wt. | 670 | 530 | 446 |
| A, 100 parts by wt. | Q, 0.30 parts by wt. | 640 | 510 | 446 |
| B, 100 parts by wt. | — | 620 | 410 | 457 |
| B, 100 parts by wt. | M, 0.50 parts by wt. | 700 | 510 | 455 |
| B, 100 parts by wt. | N, 0.30 parts by wt. | 680 | 420 | 457 |
| B, 100 parts by wt. | O, 0.10 parts by wt. | 810 | 590 | 457 |
| B, 100 parts by wt. | P, 0.15 parts by wt. | 690 | 600 | 457 |
| B, 100 parts by wt. | R, 0.30 parts by wt. | 710 | 580 | 455 |
| B, 100 parts by wt. | Q, 0.15 parts by wt. | 780 | 560 | 446 |

The samples prepared using antioxidant P showed significant discoloration, whereas all of the other samples maintained their initial white/colorless nature substantially completely.

As is well known, a decreasing torque on the rotor of the Brabender Plasticorder indicates degradation of the polymer sample therein, as the processing continues.

The above results, in comparison with those of Table II, indicate that the combined antioxidant system according to the present invention is significantly more effective in protecting these polystyrenes agingst oxidative degradation than any of the other materials, with the possible exception of antioxidant P, which as noted suffers from the serious disadvantage that it discolors the polymer. Moreover, the combined antioxidant system according to the invention is much more effective than either of its constituent compounds (N and O) used alone, and is more effective in combination than would have been predicted from a consideration of the results obtained by use of the individual constituent compounds thereof alone.

What is claimed is:

1. A process of preparing expanded polystyrene which comprises preparing a foam extruder feed material comprising from about 20 to about 50 parts by weight of solid pellets of previously expanded recycle foam polystyrene, said recycle polystyrene having been reduced from expanded foam by compaction and extrusion at temperatures in the 400°-550° F. range and by repelletization, and from about 80 to about 50 parts by weight of pellets of virgin polystyrene; and from about 0.01 to about 0.5 parts by weight of 1,1,3-tris(2-methyl-4-hydroxy-5-tertiary butyl phenyl) butane and from about 0.02 to about 1.0 parts by weight of tris(mixed mono- and dinonyl phenyl) phosphite; feeding said feed material to a first stage being an extruder operating at temperatures of from 400°-550° F. so as to melt and homogeneously mix the feed material; adding blowing agent to said molten material in the first stage, and dispersing the blowing agent within the molten material therein; feeding the material to a second stage being a section of said extruder or a second extruder operating at lower temperatures so as to cool the feed material to temperatures of from about 230°-315° F.; and extruding the material from said second stage through a die, at a temperature of from about 230°-215° F., and foaming the extrudate.

2. The process of claim 1 wherein said virgin polystyrene has a weight average molecular weight of not less than about 280,000, as determined by gel permeation chromatography, and said recycle polystyrene is derived from a virgin polystyrene of weight average molecular weight not less than about 280,000 as determined by gel permeation chromatography.

3. The process of claim 2 wherein the foam extruder feed material comprises from about 0.05 to about 0.2 parts by weight of 1,1,3-tris(2-methyl-4-hydroxy-5-tert-.butyl phenyl) butane and from about 0.15 to about 0.5 parts by weight of tris(mixed mono- and dinonylphenyl) phosphite.

* * * * *